United States Patent [19]

Denton

[11] Patent Number: 4,674,606

[45] Date of Patent: Jun. 23, 1987

[54] COOLING AND DRYING FINS FOR BRAKE DRUMS AND FLYWHEELS

[76] Inventor: Lynn Denton, 3205 10th Ave., Council Bluffs, Iowa 51501

[21] Appl. No.: 833,541

[22] Filed: Feb. 27, 1986

[51] Int. Cl.⁴ ............................................. F16D 65/827
[52] U.S. Cl. ............................. 188/264 R; 192/113 A
[58] Field of Search ....... 188/264 R, 264 A, 264 AA; 192/113 A; 74/606 A

[56] References Cited

U.S. PATENT DOCUMENTS

| | | | |
|---|---|---|---|
| 1,966,169 | 7/1934 | Forbes | 188/264 R |
| 2,458,392 | 1/1949 | Logan | 192/113 A X |
| 2,713,928 | 7/1955 | Pohl | 192/113 A |
| 2,896,749 | 7/1959 | Gaylord | 188/264 R |
| 3,023,858 | 3/1962 | Yocom | 188/264 R |
| 3,127,959 | 4/1964 | Wengrowski | 188/264 R |
| 3,214,140 | 10/1965 | Marks et al. | 188/264 R X |
| 3,240,302 | 3/1966 | Van Tuyl | 192/113 A X |
| 3,727,431 | 4/1973 | Yokel | 192/113 A X |

FOREIGN PATENT DOCUMENTS

| | | | |
|---|---|---|---|
| 134667 | 4/1933 | Austria | 188/264 R |
| 586652 | 11/1959 | Canada | 188/264 R |
| 500791 | 11/1954 | Italy | 188/264 R |
| 148936 | 8/1931 | Switzerland | 188/264 R |

Primary Examiner—George E. A. Halvosa
Attorney, Agent, or Firm—Zarley, McKee, Thomte, Voorhees & Sease

[57] ABSTRACT

Cooling and drying fins are placed interiorly of a brake drum between the brake linings and upright wall of the drum for forcing air across the braking surfaces of the drum. Air is drawn in through the opening between the brake shoes and axle assembly for a continuous air source whenever the vehicle is moving in a forward direction.

5 Claims, 13 Drawing Figures

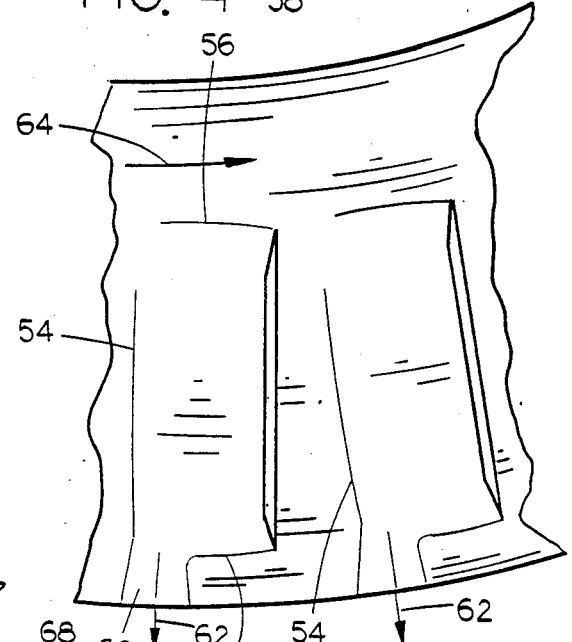
FIG. 4
FIG. 5
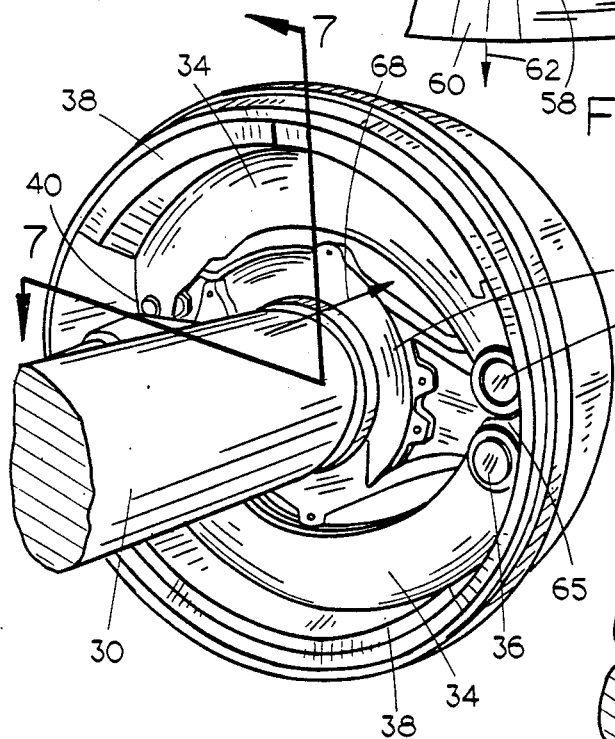
FIG. 6
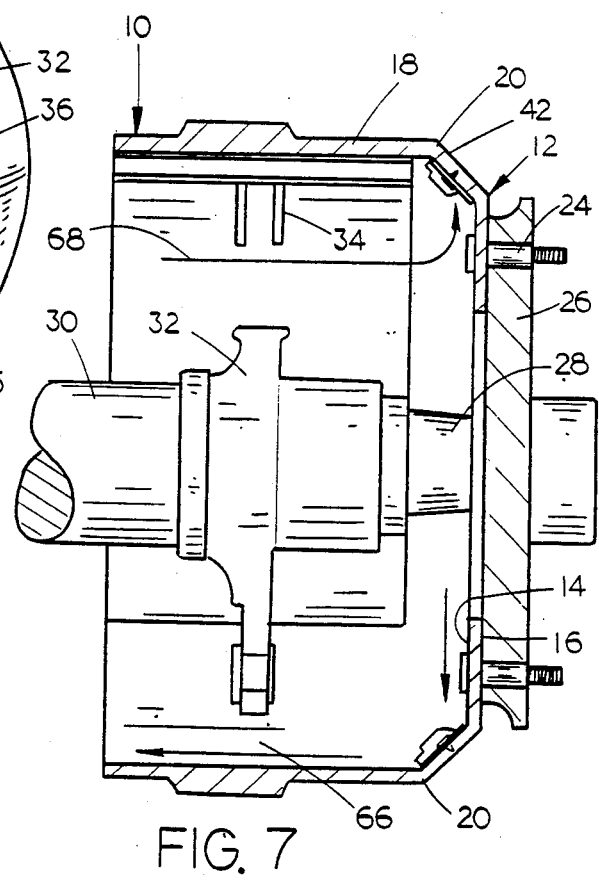
FIG. 7

COOLING AND DRYING FINS FOR BRAKE DRUMS AND FLYWHEELS

BACKGROUND OF THE INVENTION

The present invention is directed generally to cooling and drying fins for brake drums and flywheels and more particularly to such fins on the brake drums and flywheel of heavy duty trucks Approximately eighty percent of the accidents involving the big 18-wheel tractor-trailer trucks are caused by wet brakes. To dry their brakes, truckers can power brake (drive with the left foot on the brake pedal) but this results in significant wear of the brake shoes and drums. Mechanical shields have been proposed to keep the brakes dry but these cut off air circulation and make the brakes and wheel bearings run much hotter. Custom brake drums have been proposed including means for directing air exteriorly into the space between the wheel and brake drum but these are positioned radially away from the braking surfaces and operate to attract moisture along with the air.

One solution proposed by this applicant and disclosed in copending patent application Ser. No. 710,227 filed Mar. 8, 1985, now U.S. Pat. No. 4,621,715, was to provide an elongated flexible strip adapted to wrapped around the peripheral wall of a brake drum adjacent the free interior edge thereof. A row of fins connected to the strip extended radially inwardly therefrom at a position adjacent to and interiorly of the interior edge of the brake drum to create a vacuum and effect a rush of air interiorly away from the brake drum both to dissipate moisture on the braking surfaces as well as prevent the entry of moisture from the ambient atmosphere. Whereas that invention has operated successfully, it has been found that other structure can accomplish substantially the same result by blowing air interiorly across the interior surface of a brake drum rather the sucking air thereacross.

Furthermore, it has been found that similar problems of heat and dust buildup are associated with the flywheel within the bell housing of the truck transmission. Dust and moisture tend to eat away at the flywheel and heat resulting from constant operation of the engine at approximately 2100-2300 RPM can produce stress cracks in the flywheel. Elevated operating temperatures furthermore reduce the life of the throw-out bearing and pilot bearing which therefore requires more frequent repairs and /or expensive overhauls.

A primary object of the invention therefore is to provide improved cooling and drying fins for brake drums and flywheels while in use on the road.

Another object is to provide such an apparatus for brake drums which is visually concealed and positioned so as not to interfere with inspection of or access to the brakes of a truck.

Another object is to provide such an apparatus readily suited for use with single or multiple axle vehicles and trailers.

Another object is to provide such an apparatus for the flywheel which will be operative to pull dust from the pressure plates and flywheel and create a cooling air flow for reducing the operating temperature of the flywheel and associated clutch structure.

Finally, an object is to provide the cooling and drying fins in structure which is economical to manufacture, easy to install and efficient in operation.

BRIEF DESCRIPTION OF THE DRAWINGS

FIG. 4 is an enlarged partial elevational view of one of the cooling fins;

FIG. 5 is an enlarged top plan view of cooling fins of the invention,

FIG. 6 is a perspective view of a brake drum installed on a vehicle axle assembly;

FIG. 7 is a sectional view of the installed brake drum and cooling fins;

DESCRIPTION OF THE PREFERRED EMBODIMENTS

Figure 1:
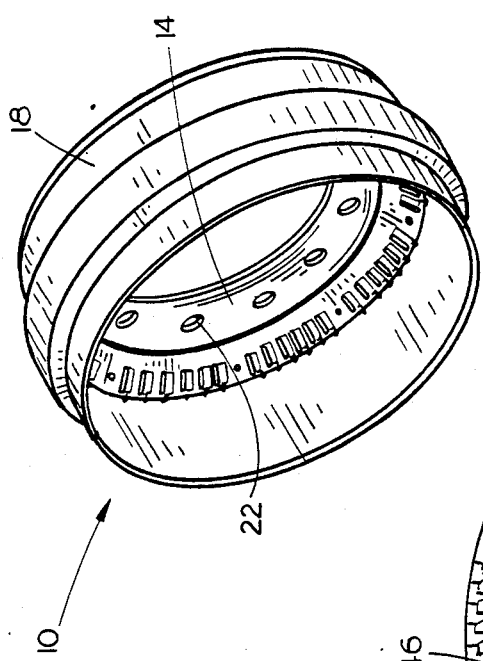
FIG. 1 is a perspective view of a brake drum including the attachment strip of cooling fins of the invention.

FIGS. 1, 6 and 7 show a conventional truck brake drum 10 including a generally upright exterior wall 12 having interior and exterior surfaces 14 and 16 respectively and a generally cylindrical wall 18 extended interiorly from the outer periphery 20 of the exterior wall 12. The exterior wall 12 of the illustrated brake drum 10 includes a planar inner portion with the ten holes 22 through which studs 24 are extended for mounting the brake drum on the wheel supporting hub 26. The hub is rotatably mounted on axle 28 which protrudes exteriorly from the stationary axle sleeve 30 on which the brake assembly 32 is mounted.

As shown in FIGS. 6 and 7, the brake assembly 32 includes a pair of shoes 34 which are pivotally mounted at adjacent ends 36 and which carry the brake linings 38. Upon actuation of the brakes, the opposite ends 40 of the shoes are forced apart urging the linings against the brake drum to stop the vehicle. Substantial heat is generated by constant braking. That heat is partially dissipated by the cooling fins of the invention.

Referring again to FIG. 7, exterior wall 12 further includes a generally frusto conical shaped outer portion 42 which merges with the cylindrical wall 18 at the outer periphery 20. The cooling fins of the invention are mounted on the interior surface of the frusto conical outer portion 42.

Figure 3:
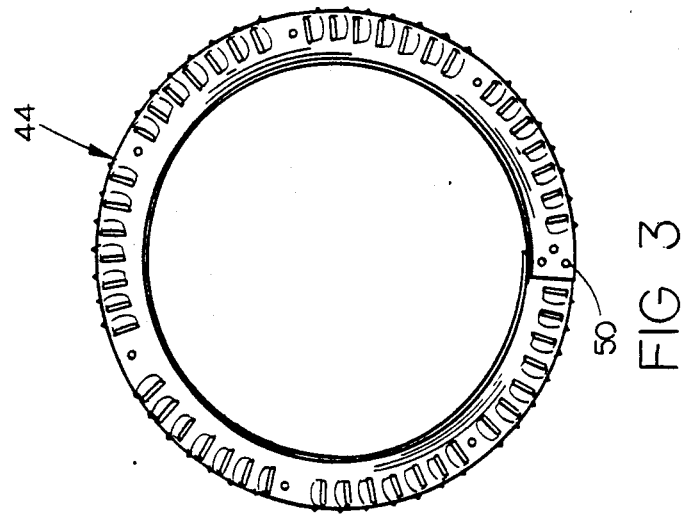
FIG. 3 is a perspective view of the elongated cooling fin strip in the frusto-conical shape resulting from joinder of the opposite ends.
Figure 2:
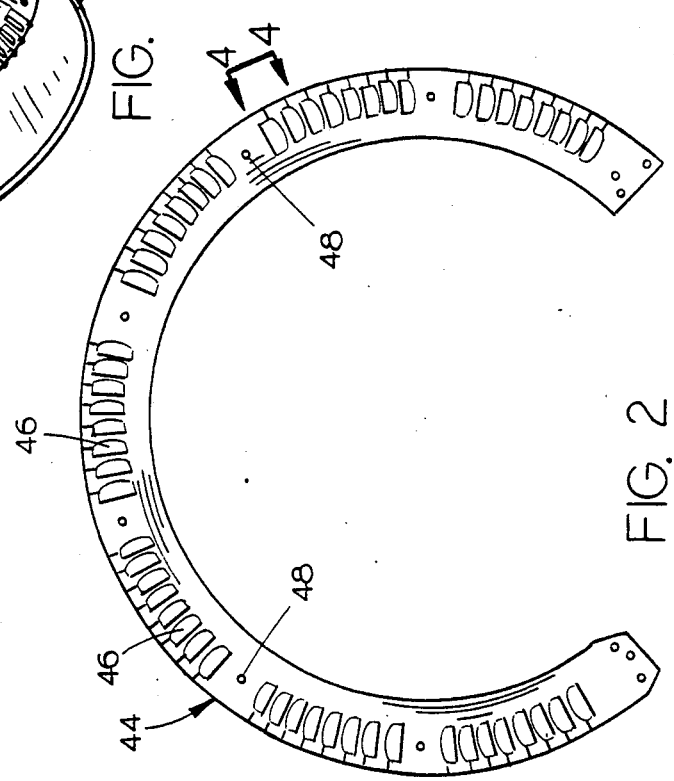
FIG. 2 is a top plan view of the elongated cooling fin strip with the ends in spaced apart relation.
Figure 8:
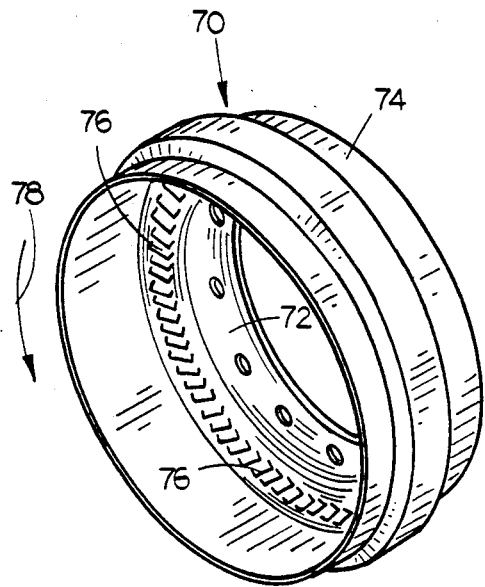
FIG. 8 is a perspective view of an alternate brake drum including integral cooling fins formed therein.
Figure 9:
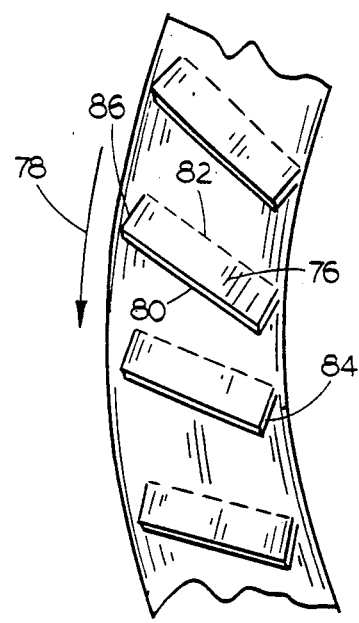
FIG. 9 is an enlarged detail view of the cooling fins of FIG. 8.

FIG. 2 shows a partially circular elongated flexible strip 44 having a plurality of fins 46 formed therein as well as several mounting holes 48. Upon joinder of the spaced apart opposite ends of strip 44 by a fastening screw 50 (FIG. 3) the outer edges are bent up to give the strip a frusto conical shape which matches the inclination of the interior surface of frusto conical portion 42 of the brake drum 10. The strip is placed against said interior surface and secured therein by fastening screws 50 which are received into holes registered with the strip mounting holes 48.

A preferred shape of the fins 46 is illustrated in FIGS. 4 and 5. Each fin 46 includes a raised socket-defining projection having an open leading side 52, a closed trailing side 54 adjoined to the strip 44 and inner and outer ends 56 and 58. At least the trailing end of outer end 58 is opened by a raised passageway 60 for exausting collected air as indicated by arrows 62 in response to rotation of the strip 44 in the direction of arrow 64. The size and shape of the fins are not critical to the present invention but the illustrated shape is preferred for the venturi effect which directs high velocity air toward and across the interior braking surface of the brake drum 10.

In operation, and referring to FIG. 6, much of the air which is directed interiorly from the fins impinges upon the brake shoes 34 and linings 38. However, there is an approximately three-eighths inch spacing 65 between the adjacent ends 36 of the brake shoes and an approximately ten inch spacing 66 between the opposite ends 40 of the brake shoes. There is also an approximately 1/16" gap between the linings and drum when the brakes are not being applied. The air which rushes out through these spaces creates a vaccum which draws air into the brake drum between the shoes 34 and axle sleeve 30, as indicated by arrows 68 in FIGS. 6 and 7. Thus the constant air flow across the brake shoes when the truck is moving dissipates heat and moisture and cleanses the drum of any dust buildup.

An alternate form of the invention is illustrated in FIGS. 8–11 wherein brake drum 70 includes a generally planar exterior wall 72 which, at its outer periphery, merges into the interiorly directed cylindrical wall 74. In this drum, the cooling fins 76 are integrally formed as part of the drum and are arranged in circumferentially spaced relation adjacent the outer periphery of the exterior wall 72. The fins are so shaped and positioned for causing air flow radially outwardly from the fins toward the cylindrical wall 74 in response to rotation of the brake drum in the direction of arrow 78. Each fin is formed with a raised leading edge 80, a trailing edge 82 connected to exterior wall 72 and inter and outer ends 84 and 86.

Figure 10:
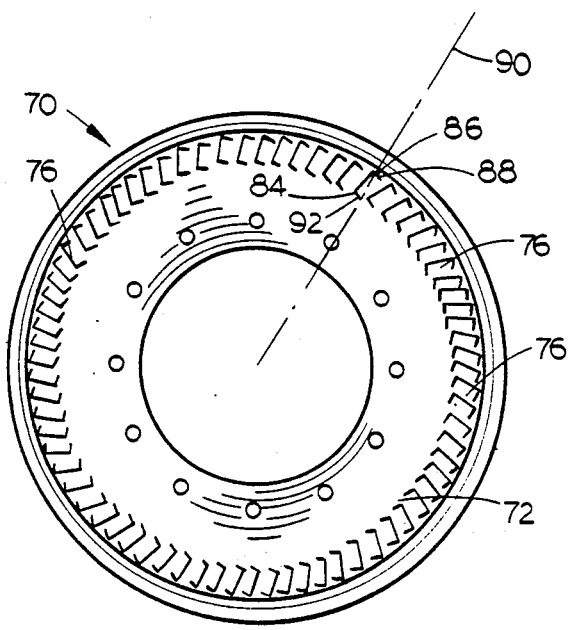
FIG. 10 is an interior elevational view of the brake drum of FIG. 8.
Figure 11:
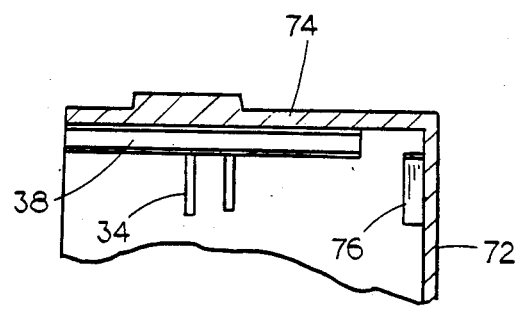
FIG. 11 is an enlarged partioal sectional view showing the integral cooling fin of the invention.

The fins are inclined relative to a true radial line to further direct the air outwardly toward the braking surfaces of the drum. Referring to FIG. 10, it is seen that the trailing edge 88 of the outer end 86 is disposed behind a radial line 90 through the trailing edge 92 of the inner end 84. Whereas the fins shown in the embodiment of FIGS. 8–11 differ from those shown in the embodiment of FIGS. 1–7, it should be understood that either type of fin and others as well, could be employed in either embodiment.

Thus it can be seen that the fins can either be added to a conventional brake drum 10 by means of the flexible strip 44 or they can be integrally molded into the drum 70 itself. In both instances, the fins function to direct a cooling and cleansing air flow interiorly across the braking surfaces of the drum.

Figure 12:
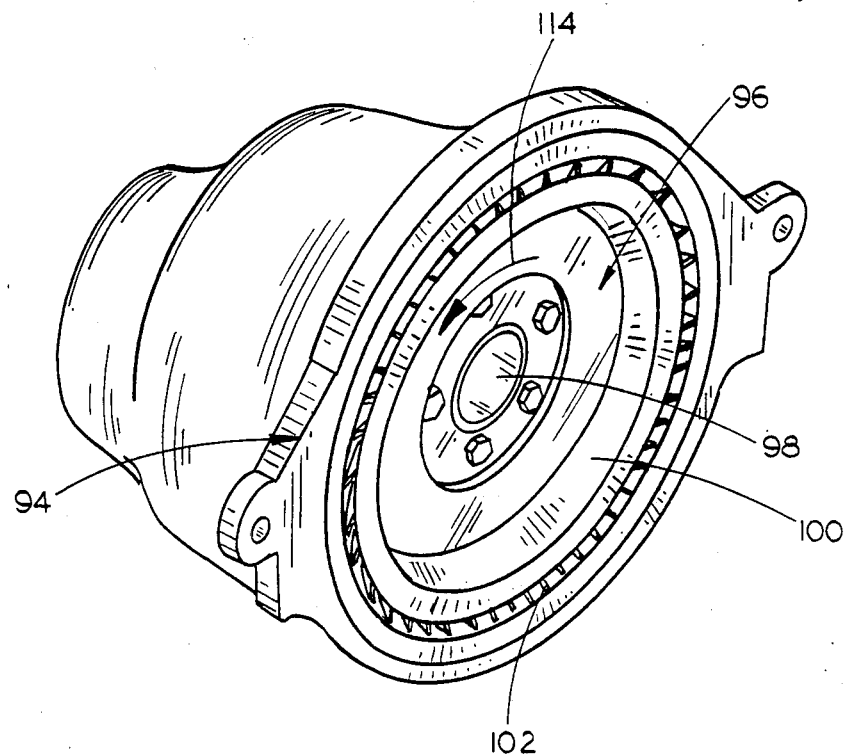
FIG. 12 is a perspective view of a flywheel equipped with cooling fins within the bell housing of a truck transmission.
Figure 13:
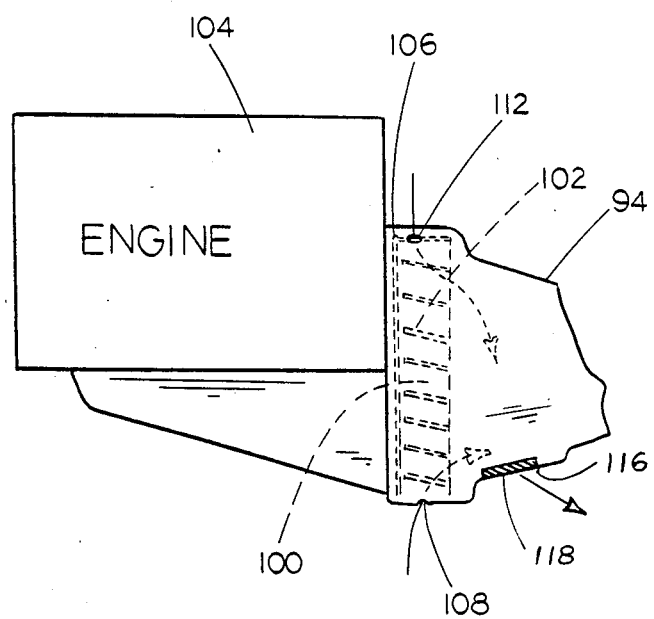
FIG. 13 is a partially diagrammatic side elevational view of an engine and bell housing assembly including the cooling fins improvement of the invention.

Referring to FIGS. 12 and 13, it has been found that the principle of the invention is easily applicable to the flywheel within the bell housing 94 of an automotive transmission. The flywheel 96 in FIG. 12 has a central bore 98 and an outer peripheral flange 100. A series of circumferentially spaced apart fins 102 are positioned on the outer peripheral surface of the flywheel 96 for directing air flow rearwardly of the flywheel in response to rotation of the flywheel.

FIG. 13 is a diagrammatic view showing the flywheel 96 within the bell housing 94 assembled onto an engine 104. A ring gear 106 is press fit onto the flywheel. The fins are inclined relative to the access of the flywheel so that the forward end of each fin is arranged ahead of the rearward end relative to the direction of rotation of the flywheel as indicated by arrow 114 in FIG. 12. The fins may have a shape similar to the fins 46 or 76 of the previous embodiments.

The bell housing 94 may be modified to accommodate the cleansing airflow through it. Whereas a hole 108 is generally conventionally provided through the bottom of the bell housing directly below the flywheel, it is preferred that a couple of additional holes be provided through the top of the bell housing forwardly of the rearward end of the flywheel, as indicated at 112 in FIG. 13, so that all of the holes 108 and 112 cooperate to afford adequate air inlets. It is contemplated that the air would be discharged from the bell housing through the conventionally provided inspection plate opening 116. The conventional cover plate for that opening, however, is replaced with a louvered or perforated cover plate 118 which permits the ready discharge of air through it. The combined solid and dotted line arrows in FIG. 13 indicate the air flow path through the bell housing.

In operation, the flywheel fins of the invention effectively cool the flywheel and adjacent clutch structure whenever the engine is running, even during idling. Dust, which tends to eat away at the flywheel over time, is blown out of the bell housing thereby increasing the effective life of the flywheel. Similarly, the reduced temperature of the flywheel due to the cooling airflow significantly guards against stress cracks from heat. The reduced operating temperatures of the throw-out bearing and pilot bearing also increases the useful life of these members and extends the time period between necessary repairs.

Thus there has been shown and described cooling and drying fins for brake drums and flywheels which accomplish at least all of the stated objects.

I claim:

1. An apparatus for drying and cooling a brake drum including a generally upright annular exterior wall having axially interior and exterior surfaces and a generally cylindrical wall extended interiorly from the outer periphery of the exterior wall, said apparatus comprising, a generally circular elongated flexible strip, means for securing said strip on the interior surface of said exterior wall adjacent said cylindrical wall, and a plurality of fins on said strip, said fins being arranged in circumferentially spaced relation thereon and so shaped and positioned for causing air flow generally outwardly from said fins toward said cylindrical wall in response to rotation of the brake drum in one direction, each fin comprising a projection defining a raised socket having an open substantially radially extending leading side, a closed substantially radially extending trailing side and radially inner and outer ends, said open leading side being arranged ahead of said closed trailing side with reference to rotation in said one direction and the outer end being at least partially open for substantially radially exhausting collected air in response to rotation of the strip in said one direction, said outer end of each socket having circumferentially spaced leading and trailing ends with respect to rotation in said one direction, said leading end contacting the strip to prevent air flow therethrough and said trailing end defining said partial opening for passage of air flow therethrough.

2. The appparatus of claim 1 wherein said elongated flexible strip has a frusto-conical shape adapted for flush engagement against a matching surface adjacent the outer periphery of said exterior wall of a brake drum.

3. The apparatus of claim 1 wherein said flexible strip has interior and exterior surfaces, said strip being formed for flush engagement of substantially the entire exterior surface thereof against the interior surface of said drum.

4. The apparatus of claim 4 wherein said means for securimg said strip comprises a plurality of screws and a plurality of screw holes circumferentially spaced about said strip.

5. The apparatus of claim 1 wherein the circumferential extent of said outer end of said fin is substantially less than the radial extent of said open leading side of said fin.

* * * * *